US012435809B2

(12) United States Patent
Moosmann et al.

(10) Patent No.: US 12,435,809 B2
(45) Date of Patent: Oct. 7, 2025

(54) FILLING AN ARMATURE SPACE OF AN ACTUATOR

(71) Applicant: ZF Friedrichshafen AG, Friedrichshafen (DE)

(72) Inventors: Markus Moosmann, Grünkraut (DE); Karlheinz Mayr, Bregenz (AT); Thilo Schmidt, Meckenbeuren (DE); Dominik Guldenschuh, Freiburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 250 days.

(21) Appl. No.: 18/300,005

(22) Filed: Apr. 13, 2023

(65) Prior Publication Data
US 2023/0332710 A1    Oct. 19, 2023

(30) Foreign Application Priority Data
Apr. 14, 2022 (DE) ............... 10 2022 203 777.4

(51) Int. Cl.
*F16K 31/06* (2006.01)
*H01F 7/08* (2006.01)
*H01F 7/121* (2006.01)
*H01F 7/16* (2006.01)

(52) U.S. Cl.
CPC ........ *F16K 31/0675* (2013.01); *H01F 7/081* (2013.01); *F16K 31/0693* (2013.01); *F16K 31/0696* (2013.01); *H01F 2007/086* (2013.01); *H01F 7/121* (2013.01); *H01F 7/1607* (2013.01)

(58) Field of Classification Search
CPC ............ F16K 31/0693; F16K 31/0696; F16K 31/0675; H01F 7/1607; H01F 7/121
See application file for complete search history.

(56) References Cited

U.S. PATENT DOCUMENTS

| | | | | |
|---|---|---|---|---|
| 4,230,187 A | * | 10/1980 | Seto ..................... | E21B 47/001 166/336 |
| 5,114,116 A | * | 5/1992 | Muller .................. | B60T 15/028 251/129.21 |
| 5,402,093 A | * | 3/1995 | Gibas ..................... | H01F 7/081 335/262 |

(Continued)

FOREIGN PATENT DOCUMENTS

| DE | 102009046498 A1 | 5/2010 |
|---|---|---|
| DE | 102014206635 A1 | 10/2014 |

(Continued)

OTHER PUBLICATIONS

German Search Report DE 10 2022 203 777.4, dated Oct. 26, 2022. (14 pages).

*Primary Examiner* — Craig M Schneider
*Assistant Examiner* — Christopher D Ballman
(74) *Attorney, Agent, or Firm* — Dority & Manning, P.A.

(57) ABSTRACT

An electromagnetic actuator (1) for an assembly, which has a fluid space configured to be fluidically connected to the actuator when the actuator is installed in the assembly, includes a movable armature in an armature space (6). The armature includes a movable armature rod (8). The actuator is configured to fill the armature space (6) with fluid, such as oil, via axial movements of the armature rod that draw fluid from the fluid space into the armature space (6) through a fluid path when the armature rod is fluidically connected to the fluid space.

13 Claims, 2 Drawing Sheets

(56) References Cited

U.S. PATENT DOCUMENTS

| | | | |
|---|---|---|---|
| 6,206,044 B1 * | 3/2001 | Gluf, Jr. | F04B 49/246 |
| | | | 137/625.65 |
| 7,973,627 B2 | 7/2011 | Yamagata et al. | |
| 9,651,164 B2 | 5/2017 | Arao | |
| 10,001,223 B2 * | 6/2018 | Vincon | F16K 27/029 |
| 10,139,006 B2 * | 11/2018 | Muraoka | H01F 7/126 |
| 10,427,657 B2 * | 10/2019 | Repasi | F16K 31/0675 |
| 10,808,853 B2 * | 10/2020 | Beuschel | F16K 31/0675 |
| 10,865,755 B2 * | 12/2020 | LaCorre | F16H 61/0251 |
| 11,346,458 B2 * | 5/2022 | Wechsel | F16K 31/0693 |
| 11,421,562 B2 | 8/2022 | Schatz | |
| 2004/0035472 A1 * | 2/2004 | Teltscher | F16K 31/0627 |
| | | | 137/596.17 |
| 2004/0089353 A1 * | 5/2004 | Soga | F15B 13/044 |
| | | | 137/596.17 |
| 2013/0153801 A1 * | 6/2013 | Sato | F16K 31/06 |
| | | | 251/129.21 |
| 2014/0150908 A1 * | 6/2014 | Mayr | F16K 31/0658 |
| | | | 137/614.19 |
| 2015/0013800 A1 | 1/2015 | Mayr et al. | |
| 2017/0146148 A1 * | 5/2017 | Kim | F16K 31/0624 |
| 2018/0355994 A1 * | 12/2018 | Hutchins | B60T 8/362 |

FOREIGN PATENT DOCUMENTS

| | | |
|---|---|---|
| DE | 102013213713 A1 | 1/2015 |
| DE | 102020116857 | 1/2021 |
| JP | 2001041339 A | 2/2001 |

* cited by examiner

FILLING AN ARMATURE SPACE OF AN ACTUATOR

CROSS-REFERENCE TO RELATED APPLICATION

The present application is related and claims priority to 102022203777.4 filed in the German Patent Office on Apr. 14, 2022, which is incorporated by reference in its entirety for all purposes.

FIELD OF THE INVENTION

The present invention relates generally to an electromagnetic actuator for an assembly with a fluid space, for example a gearbox.

TECHNICAL BACKGROUND

In the case of multi-stage motor vehicle automatic gearboxes known from practice, or automated manual motor vehicle gearboxes, hydraulic shift elements designed as clutches or brakes are used to engage different transmission ratio stages of the gearboxes. Here, to change or engage a desired transmission ratio stage of the gearbox, the hydraulic shift elements are charged with fluid pressure, or ventilated (with fluid pressure being dissipated), in accordance with this transmission ratio stage. Fluid valves with electromagnetic actuators are used for this purpose. Such a fluid valve is disclosed for example in DE 10 2013 213 713 A1.

SUMMARY OF THE INVENTION

Example aspects of the present disclosure provide:
an electromagnetic actuator for an assembly, in particular of a motor vehicle, which has a fluid space configured to be fluidically connected to the actuator when the actuator is installed in the assembly, having a movable armature in an armature space, wherein the armature has a movable armature rod, wherein the actuator is configured to fill the armature space with fluid, in particular oil, by virtue of the armature rod performing axial movements that draw fluid from the fluid space into the armature space via a fluid path when the armature rod is fluidically connected to the fluid space.

The actuator is configured to actuate a shift element of a gearbox and is connected to a control unit of a gearbox. In a signal transducer context, actuators are the counterpart to sensors and form the final control element in a closed control loop. During a closed-loop control operation, the actuators convert the signals into actions by which the controlled variable is influenced. One example is the opening and closing of a valve.

A housing is a fixed casing that protectively surrounds a sensitive content, or which protects the surroundings against a hazardous content.

Fluids are liquids or gases. In this patent application, a suitable fluid is for example oil.

A fluid space is a space filled with fluid. This may be referred to as an oil space if the fluid is oil.

If two components are fluidically connected, this means that fluid can flow from one component into the other component.

It is the underlying concept of example aspects of the invention to provide a fluid path between an armature space of an electromagnetic actuator and a fluid space, in particular of an assembly, in which the actuator can be installed, in order to ensure that the actuator, as the actuator operates, fills with fluid from the fluid space. The fluid space may also be provided as an additional component of the actuator.

It is therefore not necessary for the actuator to be filled with fluid in a separate working operation before the actuator is installed.

In one preferred example development of the invention, the fluid path is formed at least partially by an axial bore or depression of the armature rod, a fluid-space-side radial bore of the armature rod, and at least one armature-space-side bore of the armature rod.

The radial bore and the axial bore or depression enclose approximately a right angle.

This example embodiment has proven to be advantageous because few working steps are involved in forming the fluid path.

In one preferred example development of the invention, the armature rod is radially surrounded at a fluid-space-side end by a core, and a gap which forms a portion of the fluid path exists between the core and the armature rod.

A fluid path is thus implemented in a particularly simple manner, and without additional components, as a transition between the fluid space and the armature rod.

In one preferred example development of the invention, the armature space provides damping by virtue of the armature space having a first fluid reservoir and a second fluid reservoir, wherein the first and the second fluid reservoir are fluidically connected via a portion of the fluid path.

Here, the damping can be adjusted by adjusting the flow resistance of the fluid path between the fluid reservoirs. If, for example, the fluid path includes one or more bores, the damping can be adjusted by way of the diameter of the bore(s).

It is also expedient here if the armature rod has a first armature-space-side radial bore and a second armature-space-side radial bore which, together with the axial bore or depression, form the fluid path between the first and second fluid reservoirs.

It is therefore not necessary to machine a throttle between the first and the second fluid reservoir in order to establish a fluid path between the two fluid reservoirs. The armature rod that provides the fluid path can be drilled or milled in one working step.

In one preferred example development of the invention, an evacuation of the armature chamber of fluid during the operation of the actuator is prevented by virtue of the fluid-space-side bore of the armature rod being covered during a stroke of the actuator.

It is thus ensured that the armature space of the actuator is not evacuated during operation but escapes into the respective other fluid reservoir via the fluid path of the armature rod. The coverage may be effected for example by way of a projection of a core that radially surrounds the armature rod.

In one preferred example development of the invention, the actuator is configured to fill the armature space with fluid by way of a filling sequence that includes a predetermined number of axial movements of the armature.

The actuator is accordingly configured to automatically fill the armature space with fluid as soon as the actuator has been installed, so as to be ready for operation, in a corresponding assembly.

In one preferred example development of the invention, the armature space has, at an end situated opposite the fluid space, a ventilation gap that provides ventilation of the armature space.

An exemplary actuator according to an example embodiment of the invention includes a housing, a magnetic coil that radially surrounds an interior space, a pole tube which projects into the interior space that is surrounded by the coil, a core which projects into the interior space that is surrounded by the coil and which is situated axially opposite the pole tube, the axially movable armature in the armature space, and a bearing, wherein at least the core and the pole tube form the armature space, wherein an armature restrictor of the armature forms a throttle between the first and the second fluid reservoir, and the armature rod is mounted by the bearing, wherein the pole tube and the bearing form the ventilation gap.

The damping of the actuator can be adjusted by way of the dimensioning of the fluid path. The fluid path ensures, during a movement of the armature, that fluid can flow from the first reservoir into the second reservoir and vice versa.

It is self-evident that an assembly for a motor vehicle, for example a gearbox, a cooling circuit, a damping unit or the like, having at least one electromagnetic actuator that is arranged at a fluid space and within the assembly, is advantageous.

It is furthermore self-evident that a method for filling an electromagnetic actuator as described above is advantageous. The method includes filling the fluid space with fluid or providing a fluid-filled fluid space; installing the actuator at a fluid space; and starting a filling sequence, which includes one or more axial movements of the actuator, in order to fill the armature space with fluid.

It is thus ensured that the electromagnetic actuator fills after being installed at a fluid space.

SUMMARY OF THE DRAWINGS

Example aspects of the present invention are explained in more detail below with reference to the exemplary embodiments given in the schematic figures of the drawings. In the figures.

The accompanying drawings are intended to provide further understanding of the example embodiments of the invention. The drawings illustrate example embodiments and serve, in connection with the description, to explain principles and concepts of the invention. Other example embodiments and many of the advantages that are mentioned become apparent from the drawings. The elements of the drawings are not necessarily shown to scale with respect to one another.

In the figures of the drawings, elements, features and components that are identical, functionally identical and act in the same way are each provided with the same reference signs, unless indicated otherwise.

DESCRIPTION OF EXEMPLARY EMBODIMENTS

Example aspects of the invention will be described below with reference to oil as a fluid. It is self-evident that the selection of oil as a fluid is merely exemplary and does not limit the scope of protection of this patent application.

Figure 1:
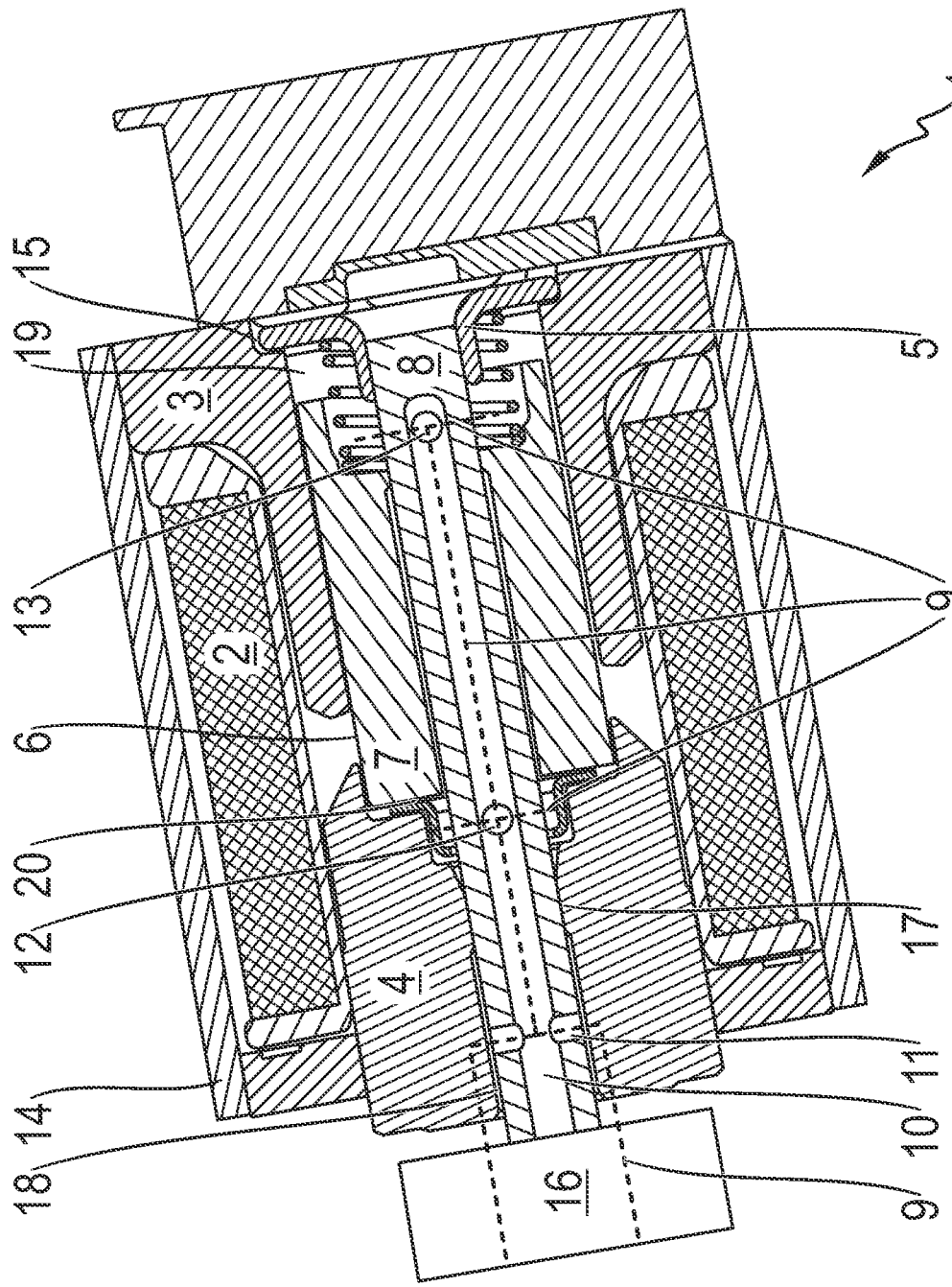
FIG. 1 shows a schematic sectional view of an electromagnetic actuator according to an example embodiment of the invention.

FIG. 1 shows a schematic sectional view of an electromagnetic actuator 1 having a magnetic coil 2, a pole tube 3, a core 4, a bearing 5, and an armature with a throttle 7 and an armature rod 8, which are surrounded by a housing 14.

The magnetic coil 2, together with the housing 14, forms an interior space of the actuator, in which the pole tube 3 and the core 4 are arranged. The pole tube 3 and the core 4 are situated axially opposite each other and delimit an armature space 6 in which the armature with the throttle 7 and the armature rod 8 is received. In FIG. 1, the throttle 7 is configured as an armature restrictor that is formed radially to the inside of the pole tube 3 and the core 4. Guided within the armature restrictor is the armature rod 8, which is mounted by a bearing 5.

The bearing 5 forms a receptacle for the armature rod 8 and, by way of a stop of the bearing 5, lies on the pole tube 3 such that a ventilation gap 15 that serves for ventilating the armature space is formed between the bearing 5 and the pole tube 3.

If the actuator 1 is fluidically connected to the fluid space 16, the actuator fills itself by way of axial strokes of the actuator 1, if the actuator is not already filled with fluid. The filling is performed by virtue of fluid, in this case oil, creeping from the fluid space 16 into the gap 18 between the armature rod 8 and the core 4. There, the fluid flows via the radial bore 11 into the axial bore 10 and onwards into the armature space 6. In the armature space 6, the armature rod 8 has two bores 12 and 13, which form a portion of the fluid path 9 between the fluid reservoir 19 and the fluid reservoir 20.

When the armature restrictor moves axially, oil flows between a first fluid reservoir 19 and a second fluid reservoir 20. Here, oil passes from one fluid reservoir 19, 20 into the respective other fluid reservoir 20, 19 by virtue of oil being forced through portions of the fluid path 9, specifically the region between the bores 12 and 13, by strokes of the armature restrictor.

If the armature rod 8 lifts, the armature rod 8 is closed by the projection 17 of the core 4. This prevents the actuator 1 from being evacuated during operation.

The armature rod 8 is formed along a longitudinal axis of the actuator 1 and thus also defines the axial movement direction of the armature.

Figure 2:
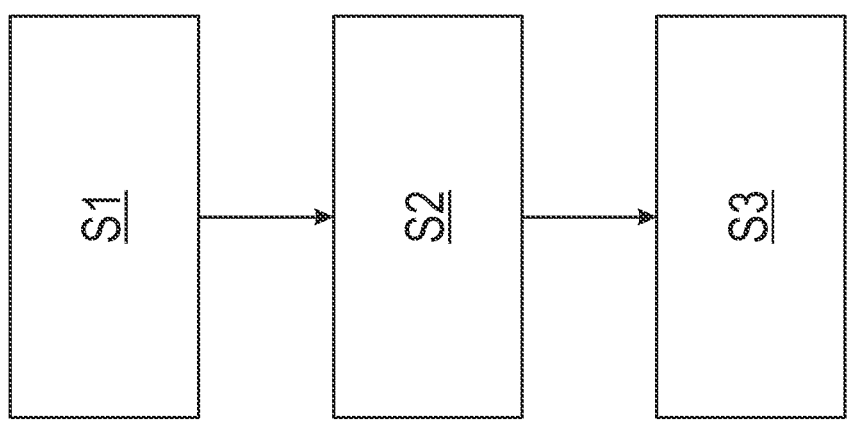
FIG. 2 shows a schematic block diagram of a method according to an example embodiment of the invention.

FIG. 2 shows a schematic block diagram of a method for filling an electromagnetic actuator with oil. The method includes the steps S1 to S3. In the step S1, the oil space is filled with oil. In the step S2, the actuator is installed at an oil space, in particular of a gearbox. In the step S3, a filling sequence with one or more axial movements of the armature is started in order to fill the armature space with oil. It is self-evident that, in particular, the sequence of the steps S1 and S2 is exchangeable. Instead of filling the oil space with oil, an oil space containing oil may also be provided. This also applies to fluid spaces that contain fluids other than oil.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS

1 Actuator
2 Coil
3 Pole tube
4 Core
5 Bearing
6 Armature space
7 Throttle
8 Armature rod
9 Fluid path
10 Bore
11 Bore
12 Bore
13 Bore
14 Housing
15 Ventilation gap
16 Fluid space
17 Projection
18 Gap
19 First fluid reservoir
20 Second fluid reservoir
S1-S3 Method steps

The invention claimed is:

1. An electromagnetic actuator (1) for a motor vehicle with a fluid space (16) configured to be fluidically connected to the actuator (1) when the actuator (1) is installed in the motor vehicle, the actuator (1) comprising:
   a movable armature in an armature space (6), the armature comprising a movable armature rod (8),
   wherein the actuator (1) is configured to fill the armature space (6) with fluid via movement of the armature rod (8) drawing fluid from the fluid space (16) into the armature space (6) through a fluid path (9) when the armature rod (8) is fluidically connected to the fluid space (16), and
   wherein the actuator (1) is configured such that an evacuation of the armature space (6) of fluid during operation of the actuator (1) is prevented by a fluid-space-side radial bore (11) of the armature rod (8) being closed during a stroke of the actuator.

2. The electromagnetic actuator (1) of claim 1, wherein the fluid path (9) is defined at least partially by an axial bore (10) or depression of the armature rod (8), the fluid-space-side radial bore (11) of the armature rod (8), and at least one armature-space-side bore (12; 13) of the armature rod (8).

3. The electromagnetic actuator (1) of claim 1, wherein the armature rod (8) is radially surrounded at a fluid-space-side end of the armature rod (8) by a core (4), and a gap (18) that forms a portion of the fluid path (9) is disposed between the core (4) and the armature rod (8).

4. The electromagnetic actuator (1) of claim 3, wherein the fluid-space-side radial bore (11) of the armature rod (8) is closed during the stroke of the actuator by a projection (17) of the core (4).

5. The electromagnetic actuator (1) of claim 4, wherein the projection of the core (4) is defined axially between the gap (18) and a first fluid reservoir (19) of the armature space (6).

6. The electromagnetic actuator (1) of claim 1, wherein the armature space (6) is configured to provide damping via the armature space (6) having a first fluid reservoir (19) and a second fluid reservoir (20), the first fluid reservoir (19) and the second fluid reservoir (20) being fluidically connected via a portion of the fluid path (9).

7. The electromagnetic actuator (1) of claim 6, wherein the damping is adjustable by flow resistance of the fluid path (9) between the first fluid reservoir (19) and the second fluid reservoir (20).

8. The electromagnetic actuator (1) of claim 6, wherein the armature rod (8) comprises a first armature-space-side radial bore (12), a second armature-space-side radial bore (13), and an axial bore (10) or depression that collectively form the fluid path (9) between the first and second fluid reservoirs (19, 20), and the damping is adjustable by way of a diameter of the first and the second armature-space-side radial bores (12, 13).

9. The electromagnetic actuator (1) of claim 1, wherein the actuator (1) is configured to fill the armature space (6) via a filling sequence that comprises a predetermined number of axial movements of the armature.

10. The electromagnetic actuator (1) of claim 1, wherein the armature space (6) comprises a ventilation gap (15) at an end of the armature space (6) disposed opposite the fluid space (16), and the ventilation gap (15) is configured to provide ventilation of the armature space (6).

11. The electromagnetic actuator (1) of claim 1, further comprising:
   a housing (14);
   a magnetic coil (2) radially surrounding an interior space;
   a pole tube (3) projecting into the interior space surrounded by the coil (2);
   a core (4) projecting into the interior space surrounded by the coil (2), the core (4) disposed axially opposite the pole tube (3); and
   a bearing (5),
   wherein at least the core (4) and the pole tube (3) define the armature space (6),
   wherein an armature restrictor of the armature forms a throttle (7) between a first fluid reservoir (19) and a second fluid reservoir (20) of the armature space (6),
   wherein the armature rod (8) is mounted by the bearing (5), and
   wherein the pole tube (3) and the bearing (5) form a ventilation gap (15) at an end of the armature space (6) disposed opposite the fluid space (16).

12. An assembly for a motor vehicle with the fluid space (16), the assembly comprising at least one of the electromagnetic actuator (1) of claim 1 arranged within the assembly at the fluid space (16).

13. A method for filling the electromagnetic actuator (1) of claim 1 with fluid, the method comprising:
   filling (S1) the fluid space with fluid or providing a fluid-filled fluid space;
   installing (S2) the actuator at the fluid space; and
   starting (S3) a filling sequence with one or more axial movements of the actuator in order to fill the armature space (6) with the fluid.

* * * * *